United States Patent [19]
Kohn
[11] Patent Number: 4,461,666
[45] Date of Patent: Jul. 24, 1984

[54] CONTOURED BALSA-CORE LAMINATE

[75] Inventor: Henri A. Kohn, Northvale, N.J.
[73] Assignee: Baltek Corporation, Northvale, N.J.

[21] Appl. No.: 197,497
[22] Filed: Oct. 16, 1980

Related U.S. Application Data

[63] Continuation-in-part of Ser. No. 148,690, May 12, 1980, Pat. No. 4,343,846.

[51] Int. Cl.[3] B32B 31/20
[52] U.S. Cl. 156/222; 156/327; 156/330
[58] Field of Search 156/222, 221, 330, 327

[56] References Cited

U.S. PATENT DOCUMENTS

| | | | |
|---|---|---|---|
| 2,365,334 | 12/1944 | De Vries | 156/222 X |
| 2,890,148 | 6/1959 | Dede | 156/222 |
| 3,298,892 | 1/1967 | Lippay | 428/53 |
| 3,325,037 | 6/1967 | Kohn et al. | 428/119 X |
| 4,184,905 | 1/1980 | Ogata et al. | 156/222 X |

*Primary Examiner*—Alexander Thomas
*Attorney, Agent, or Firm*—Michael Ebert

[57] ABSTRACT

A contoured structural laminate formed of thin facings bonded to an end-grain balsa wood core. The laminate is produced by first bonding a liner of end-grain balsa to each facing to create front and rear plies. The exposed surfaces of the liners are then wet coated with a bonding solution, and the two plies with their coated liners in face-to-face relation are placed in a forming press which causes the front ply to assume a concave-like formation and the rear ply a complementary convex-like formation. During forming, the wet interface of the liners affords slip freedom. When the bonding agent dries and cures in the press, the plies are permanently laminated together to form the desired contoured structure.

6 Claims, 3 Drawing Figures

Fig. 1.
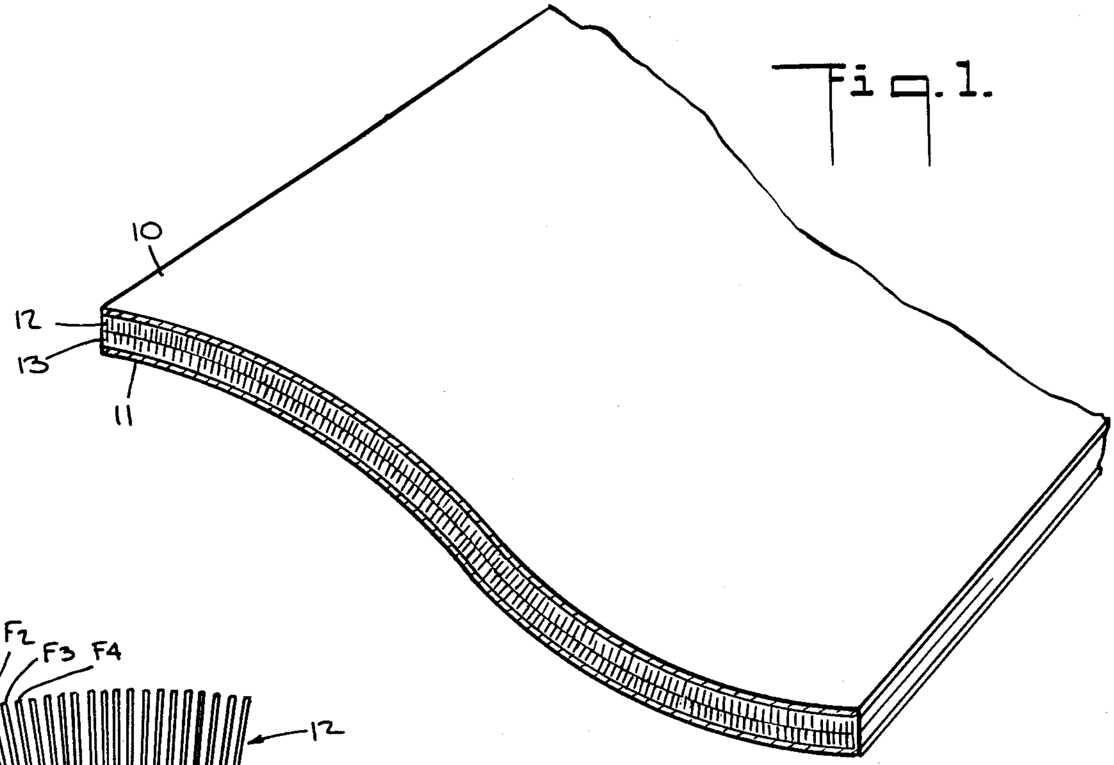
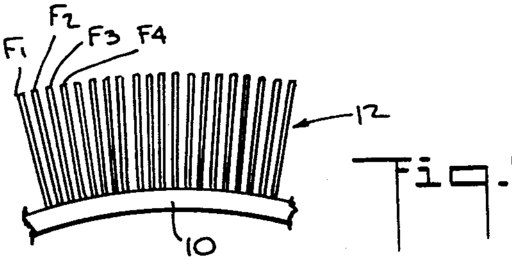
Fig. 3.
Fig. 2.
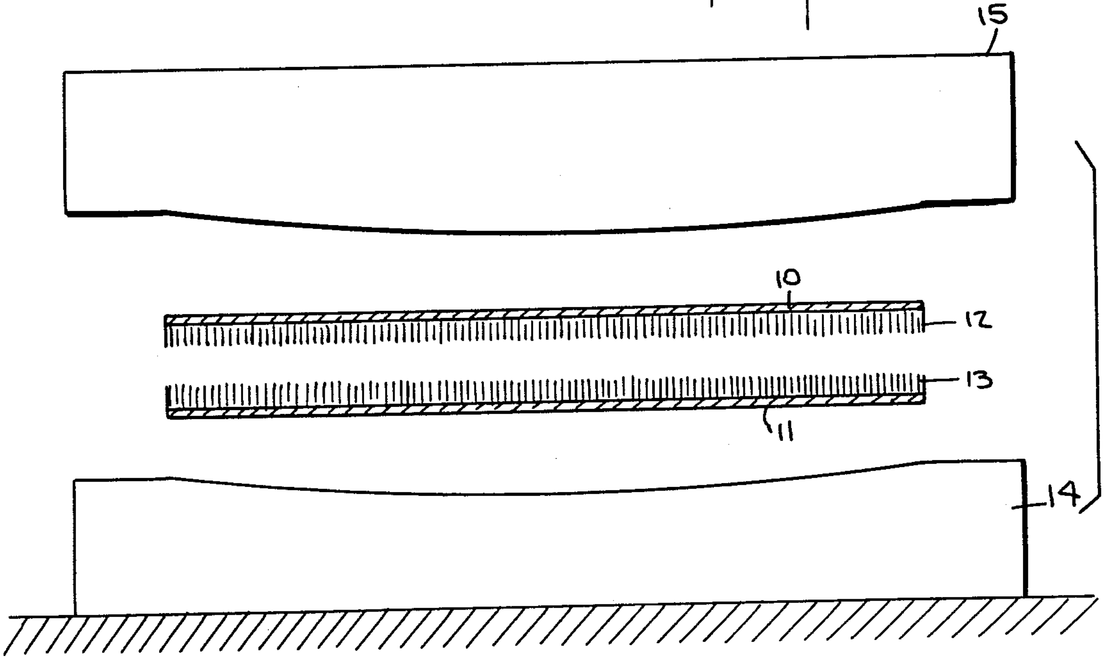

CONTOURED BALSA-CORE LAMINATE

RELATED APPLICATION

This application is a continuation-in-part of my copending application entitled "Balsa Core Sandwich Laminate," Ser. No. 148,690, filed May 12, 1980 U.S. Pat. No. 4,343,846. The entire disclosure of this copending case is incorporated herein by reference.

BACKGROUND OF INVENTION

This invention relates generally to structural laminates, and more particularly to a technique for producing a contoured laminate formed by thin facings bonded to opposite sides of a core.

While the invention will be described mainly in the context of a contoured laminate formed by aluminum sheet facings bonded to a core of end-grain balsa material, it is to be understood that the invention is not limited to these facings and core materials.

Balsa has outstanding properties unique in the field of lumber, for on the average it weighs less than nine pounds per cubic foot, this being 40% less than the lightest North American species. Its cell structure affords a combination of high rigidity and compressive and tensile strength that is superior to any composite or synthetic material of equal or higher density. Balsa is dimensionally stable and may be processed by standard woodworking techniques.

It is known that end-grain balsa wood is capable of supporting far greater loads than flat-grain material of the same density and that low-density balsa in the end-grain direction will support greater loads than flat-grained material of higher density. The cellular structure of balsa is such that the number of cells per cubic foot is extremely high, the wall thickness of each cell being quite thin. The cells are effectively independent of each other, each cell being comparable to an independent column or fiber. The fibers of balsa wood are substantially parallel to each other.

Structural sandwich laminates can be created by bonding thin facings or skins to balsa wood panels which function as a core. Thus the Kohn et al. U.S. Pat. No. 3,325,037 and the Lippay U.S. Pat. No. 3,298,892 disclose structural sandwich laminates whose core is formed of end-grain balsa, the resultant laminates having a remarkably high strength-to-weight ratio as well as excellent thermal insulation properties.

End-grain balsa-core sandwich laminates are widely used in transportation and handling equipment, such as for floors of railroad cars, shipping containers, cargo pallets, bulkheads, doors and reefer bodies, as well as in a variety of other applications. These laminates are also employed for structural insulation in aircraft applications, in housing and in boating.

In some applications, the need exists for a contoured balsa core laminate having thin metal facings, the curvature being appropriate to that of a boat hull, a tank or other shaped article. The use of contoured aluminum sheeting to form canoes and other small boats is well known. Because a thin aluminum hull is lacking in strength and stiffness, reinforcement expedients such as ribs must be used. This complicates the manufacture of the boat, it adds to the cost thereof and results in a small boat interior having obstructions.

Moreover, a hull made entirely of aluminum has other undesirable properties; for when the boat is driven by an outboard motor, the metal hull acts as a resonator and picks up and effectively amplifies motor noise and vibration. This not only results in discomfort to the passengers of the boat, but when the boat is used for fishing, the noise is transmitted to the surrounding waters and tends to drive away the fish.

The drawbacks incident to aluminum and other metal hulls could, in theory, be obviated by a laminate sandwich structure using a balsa core bonded to thin aluminum facings. This structure would inherently possess far greater strength than a non-laminated hull and have the added advantage of being relatively quiet, for a balsa wood core affords acoustic damping. Also, the balsa core would impart buoyancy to the boat hull.

And while one can produce a balsa core-aluminum facings laminate in the manner disclosed in the above-identified copending patent application, this laminate cannot be contoured to conform to a hull or any other curved form. Should one bond aluminum facings to an end-grain balsa core and then seek to form the laminate to cause it to assume a predetermined contour, the balsa core would rupture in the course of bending.

End-grain balsa is composed of a myriad of parallel fibers, and should these fibers be bonded at one end to a planar metal facing and at the other end to a parallel planar facing, the resultant rigid structure would be highly resistant to deformation. Should the planar laminate then be subjected to heavy bending stresses, the balsa core would be ruptured in the forming process.

SUMMARY OF INVENTION

In view of the foregoing, it is the main object of this invention to provide a contoured laminate formed of thin facings bonded to opposite sides of a core to produce a sandwich structure of light weight and high strength. A preferred form of a contoured structural laminate in accordance with the invention is formed of thin metal facing bonded to an end-grain balsa wood core, the laminate having superior structural characteristics comparable to that of a planar balsa-core laminate.

Also an object of this invention is to provide a technique for producing a contoured balsa-cored sandwich laminate which imparts the desired curvature to the structure without rupturing or otherwise impairing the balsa wood core.

Yet another object of this invention is to provide a contoured end-grain balsa core laminate whose contour is appropriate to the formation of boat hulls, tanks and other shaped objects, the inherent structural strength of the laminate doing away with the need for reinforcing expedients such as ribs.

Briefly stated, these objects are accomplished by first bonding a liner of end-grain balsa or other core material to each of the facings of the laminate to create front and rear plies. The exposed surfaces of the liners are then wet-coated with a bonding solution, and the two plies with their coated liners in face-to-face relation are placed in a forming press such as a press composed of matching male and female dies, the press forcing the front ply to assume a concave-like formation, and the rear ply a complementary convex-like formation.

Because the wet bonding solution at the interface of the liners affords slip freedom in the press, the forming action has no disruptive effect on the balsa core. When the bonding agent dries and cures, the two plies are permanently bonded together to form the desired sandwich laminate. In practice, the liners may be of reticulated balsa material to reduce the weight of the resultant structure.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a contoured structural laminate in accordance with the invention, the laminate having an end-grain balsa wood core;

FIG. 2 is a schematic illustration of the forming operation by which two plies of lined metal facings are curved to assume the desired configuration; and FIG. 3 illustrates the effect of bending on a ply.

DESCRIPTION OF INVENTION

Referring now to FIG. 1, there is shown a contoured-sandwich laminate having an end-grain balsa wood core in accordance with the invention, the laminate including two thin metal facing sheets 10 and 11, which in practice may be of aluminum, steel or any other metal, depending on the end use of the laminate. Thus for the formation of a light-weight boat hull, aluminum would be the appropriate metal; whereas for tanks and other loaded enclosures, steel may be preferable.

While facing sheets 10 and 11 are shown in FIG. 1 as having a contoured formation, in a technique in accordance with the invention, the facing sheets are initially in planar form as shown in FIG. 2. Bonded to one surface of the facing sheets are end-grain balsa-wood liners 12 and 13, each having a thickness equal to one-half the thickness of the desired core. Assuming, therefore, a one-inch thick core, each liner will have a ½ inch thickness. The lined sheets constitute a pair of plies.

A preferred adhesive for effecting an aluminum-to-balsa bond is a modified epoxy adhesive that is heat-curable at relatively high temperatures, such as 200° F. Suitable for this purpose is the Ciba-Geigy epoxy adhesive known as "Reliabond 382-B."

Commercial balsa wood is normally kiln-dried to reduce its moisture content to about 10 to 12%. The steps necessary to kiln-dry wood and the recommended practices therefor are set out in Publication #188 of the U.S. Department of Agriculture Forest Service, Forest Products Laboratory. However, if kiln-dried wood is stored in a humid temperature, its moisture content may rise substantially. In any case, even if the balsa wood to which an aluminum skin is to be laminated has a moisture content of no more than 10%, because of hot curing necessary for the preferred epoxy adhesive, the heat will volatilize the moisture and the resultant vapors will interfere with effective lamination.

Hence to effect proper lamination, the balsa panel used in a laminate in accordance with the invention must first be kiln-dried to a moisture content of about 2 to 3%. And because the aluminum normally has an oxide film thereon which is resistant to epoxy bonding, this film must first be removed, preferably by etching the surface with hydrochloric acid. After the surface is etched, primer is brushed thereon and baked to adhere to the clean aluminum surface, the primer being of a composition appropriate to the epoxy adhesive used.

FIG. 3 is an exaggerated view of fibers $F_1$, $F_2$, $F_3$, $F_4$, etc. in the end-grain balsa wood structure of liner 12 bonded to the surface of metal facing sheet 10 to form one of the two plies. Because the fibers are in a substantially parallel array and the fibers are anchored at one end only, when sheet 10 is bent to create a convex form, the fibers, which are free to move, then fan out to conform to this curvature. Hence as long as the fibers are unrestrained at their unbonded ends, they are not disrupted by the bending action. Conversely, when the bending creates a concave form, the free ends of the fibers become more closely bunched but they are not disrupted.

As shown in FIG. 2, two plies are placed in a forming press with their exposed surfaces in face-to-face relation. The forming press includes a stationary female die 14 having the desired contour and a complementary male die 15 which may be hydraulically or mechanically operated. Before the dies are brought together to compress and form the plies, the exposed balsa-wood liner surfaces are coated with a wet solution of an adhesive such as urea formaldehyde.

Because the wet bonding solution at the interface of the liners affords slip freedom in the press, the bending action has no disruptive effect on the balsa. Hence in the press, the two plies are caused to conform to the die contour. In order to effect accelerated drying and curing, the application of moderate heat may be advantageous. In practice, the dies may incorporate electrical heating elements to provide such heat. After curing is effected, the plies are permanently bonded together, at which point the male die is retracted and the contoured laminate is removed from the press.

In my copending application, the advantages of a reticulated end-grain balsa wood core are spelled out, and the manner in which this core is produced is disclosed in detail. Since a core of this type essentially retains the structural characteristics of a solid core but with reduced weight, reticulated liners may be used in the present invention where lightness is an important desideratum.

It is to be noted that to obtain a strong bond between an aluminum sheet or other facing skin with a balsa core liner, this requires relatively high temperature and pressure conditions; whereas these conditions are not required to effect a bond between two balsa core liners, the latter being a simple operation. A significant advantage of the present invention is that because bonding of the balsa liner to a metal or other facing to produce a ply is a planar operation, even though the ultimate product is contoured, this may be carried out without difficulty and at a rapid rate in a flat press.

With planar plies mass-produced in a flat press, the procedure involving contouring and interconnection of the plies is simplified; for this operation does not require high temperature and pressure conditions. In practice, therefore, planar plies may be manufactured in stock sizes, and these may be used at different facilities to produce contoured laminates in various shapes.

In contouring the planar plies, use may be made of matched dies in a forming press in the manner previously described. However, contouring can also be carried out in vacuum molds and with pinch rollers, using known contouring or bending techniques for this purpose.

While the invention has been described in connection with aluminum and other metal sheet facings, these facings or skins may be fabricated of non-metallic materials such as wood veneer or fiber-reinforced plastics. And while the invention has been described in conjunction with a wet bonding solution to effect bonding, in practice any bonding agent that affords slip freedom in the course of contouring may be used for interconnecting the plies. Thus the balsa liners may be pre-impregnated with a heat or otherwise activatable dry bonding agent, the agent being activated just before or during the forming operation so that there is slip freedom in the course of forming, and curing takes place after the plies are contoured.

It is not essential that each balsa liner have a thickness equal to half the core thickness, as described above. Indeed, it may be desirable that the thickness of the liners be unequal. Since one ply is caused to assume a convex form in which the parallel fibers of the balsa liner fan out in the manner illustrated in FIG. 3, this liner may be relatively thin. But since the other ply is caused to assume a concave form in which the parallel fibers of the liner are forced to converge or bunch together, this liner may be thicker. In some applications it might be desirable for the ply caused to assume a concave form to be thinner than the ply caused to assume the convex form. Hence, in practice, to create a core of predetermined thickness, this thickness may be made up of a thin liner interbonded with a thick liner, rather than balsa liners of equal thickness.

This invention is not limited to contoured laminates with balsa cores, for it may be used to advantage with other core materials which create contouring problems such as a core of polyurethane foam, PVC or even paper honeycomb material.

While there has been shown and described a preferred embodiment of a contoured balsa-core laminate in accordance with the invention, it will be appreciated that many changes and modifications may be made therein without, however, departing from the essential spirit thereof. Thus instead of forming the planar plies in a forming press, in the case of plies having aluminum facings, these may be stretched formed. In stretch forming, when the core is balsa, the stretching will act to pull out the fibers of the core but without destroying the integrity of the core. When the core is a foam material, this material has sufficient elasticity to permit stretching, this also being true to a limited degree of honeycomb cores.

I claim:

1. A technique for producing a contoured sandwich laminate having a compound curvature and a core of predetermined thickness comprising the steps of:

A. bonding a liner of end-grain balsa core material having a substantially parallel array of fibers to one surface of a first facing sheet to create one ply whereby the fibers are anchored at one end only;

B. bonding a liner of end-grain balsa core material having a substantially parallel array of fibers to one surface of a second facing sheet to create another ply whereby the fibers are anchored at one end only;

C. coating at least one of the exposed surfaces of said liners with an uncured adhesive thereon to provide slip freedom;

D. superposing the two plies with their exposed surfaces in face-to-face relation; and E. applying bending pressure to the superposed plies to cause the plies to assume the desired contour without disruption, for the fibers are free to move until such time as the adhesive is cured.

2. A technique as set forth in claim 1, wherein said exposed surfaces are wet coated with a bonding solution.

3. A technique as set forth in claim 2, wherein said bonding solution is a ureaformaldehyde adhesive.

4. A technique as set forth in claim 1, wherein said facing sheet is aluminum.

5. A technique as set forth in claim 1, wherein said liner bonding is effected in a flat press.

6. A technique as set forth in claim 1, wherein bonding of said liner of core material to said facing sheet is effected with a modified epoxy adhesive that is heat curable, curing being effected by the application of heat.

* * * * *